(12) United States Patent
Long et al.

(10) Patent No.: US 9,191,358 B2
(45) Date of Patent: Nov. 17, 2015

(54) SYSTEM AND METHOD FOR SHORT MESSAGE SERVICES TO INSTANT MESSAGING CONVERSION

(75) Inventors: William B. Long, Louisville, CO (US); Bopsi Chandramouli, Warrenville, IL (US); Todd J. Whiteley, Lake Forest, IL (US)

(73) Assignees: Level 3 Communications, LLC, Broomfield, CO (US); Vail Systems, Inc., Deerfield, IL (US)

( * ) Notice: Subject to any disclaimer, the term of this patent is extended or adjusted under 35 U.S.C. 154(b) by 170 days.

(21) Appl. No.: 13/612,638

(22) Filed: Sep. 12, 2012

(65) Prior Publication Data

US 2013/0065618 A1   Mar. 14, 2013

Related U.S. Application Data

(60) Provisional application No. 61/533,885, filed on Sep. 13, 2011.

(51) Int. Cl.
| | |
|---|---|
| H04W 4/14 | (2009.01) |
| G06F 15/16 | (2006.01) |
| H04L 12/58 | (2006.01) |
| H04L 12/66 | (2006.01) |
| H04W 4/12 | (2009.01) |
| H04L 29/08 | (2006.01) |

(52) U.S. Cl.
CPC .............. H04L 51/36 (2013.01); H04L 12/66 (2013.01); H04L 51/066 (2013.01); H04L 67/2823 (2013.01); H04W 4/12 (2013.01)

(58) Field of Classification Search
CPC ........ H04L 12/66; H04L 51/066; H04L 21/36
USPC ......................................................... 455/466
See application file for complete search history.

(56) References Cited

U.S. PATENT DOCUMENTS

| 6,674,767 B1 | 1/2004 | Kadyk et al. |
| 7,046,691 B1 * | 5/2006 | Kadyk et al. .................. 370/466 |

(Continued)

FOREIGN PATENT DOCUMENTS

| EP | 2136517 | 12/2009 |
| WO | WO-2007036052 A1 | 4/2007 |

OTHER PUBLICATIONS

International Search Report, dated Dec. 7, 2012, Appl. No. PCT/US2012/55198, filed Sep. 13, 2012, 3 pgs.
Written Opinion, dated Dec. 7, 2012, Appl. No. PCT/US12/55198, filed Sep. 13, 2012, 7 pgs.

(Continued)

*Primary Examiner* — Qun Shen
(74) *Attorney, Agent, or Firm* — Polsinelli PC

(57) ABSTRACT

Implementations of the present disclosure involve a system and method for federating communications between a first network that transmits and receives messages formatted in a first format and a second network that transmits and receives messages formatted in a second format. The system and method are configured to receive a message from the first network formatted in the first format. The system then converts the message into a unified format that may be sent to the second network. After receiving the message in the unified format, the message may then be converted into the format of the second network and sent on the second network like any other message on the second network.

18 Claims, 8 Drawing Sheets

(56) References Cited

U.S. PATENT DOCUMENTS

| | | | |
|---|---|---|---|
| 2006/0052113 A1* | 3/2006 | Ophir et al. | 455/456.1 |
| 2006/0128409 A1* | 6/2006 | Gress et al. | 455/466 |
| 2007/0083675 A1* | 4/2007 | Vemulapelli et al. | 709/246 |
| 2007/0223444 A1 | 9/2007 | Foo et al. | |
| 2009/0016499 A1 | 1/2009 | Hullfish et al. | |
| 2010/0069095 A1* | 3/2010 | Yahav et al. | 455/466 |

OTHER PUBLICATIONS

International Preliminary Report on Patentability, dated Mar. 27, 2014, Int'l Appl. No. PCT/US12/055198; Int'l Filing Date Sep. 13, 2012; 9 pgs.

Extended European Search Report, dated Feb. 24, 2015, Application No. 12831817.7, filed Sep. 13, 2012; 7 pgs.

* cited by examiner

SYSTEM AND METHOD FOR SHORT MESSAGE SERVICES TO INSTANT MESSAGING CONVERSION

APPLICATION PRIORITY

The present application claims priority under 35 U.S.C. §119(e) to U.S. Provisional Patent Application No. 61/533,885 filed on Sep. 13, 2011, entitled "SMS TO IP CONVERSION," which is hereby incorporated by reference.

TECHNICAL FIELD

Aspects of the present disclosure generally relate to network communications. More specifically, embodiments herein relate to the conversion between communications using short message services ("SMS") format and instant messaging ("IM") format.

BACKGROUND

Instant messaging is a form of communication over the internet that allows for the near instantaneous transmission and receipt of text-based messages between two or more computer users. IM allows for users to have near real-time conversations over a computer network, such as the internet, independent of the location of the users. IM generally works by having an IM client installed on a user computer that connects to an IM system or IM server. The IM client allows a user to select a person to send an IM to, enter in texts for the IM, and receive IMs from other IM users. Examples of IM clients include Microsoft® Lync®, IBM®, Lotus®, Sametime®, and Google® Talk.

Due to IM's speed and ease of use IM has become prevalent in the modern workplace. Employers large and small often include internal IM clients to help improve communication and collaboration between employees. IM messaging allows for an employee to quickly contact other employees and receive prompt responses.

SMS is a text messaging component of cellular phones that allows a phone operator to nearly instantly send a text-based message to another cellular phone. SMS messages use a standardized communication protocol that allows for a message up to 160 7-bit characters to be sent at a time. Longer messages may be broken into a series of text messages. As the use of cellular phones has proliferated SMS messaging has become increasingly popular. The introduction of "smart phones" and their ability to quickly and easily send SMS messages has further increased the use of SMS messaging. SMS messaging has further evolved to also include multimedia message services (MMS) which added the ability to send multimedia files such as photographs and videos via cellular networks.

Currently these two systems operate independently from each other. Oftentimes in commercial buildings, cellular service can be poor, unreliable, or nonexistent leading to communication issues with people outside of the enterprise environment. Additionally, SMS messages sent to employee telephones are often logged or stored in a way that is accessible to by a companies communications environment. This communications may be later overlooked or even lost if an employees phone is lost.

It is with these and other issues in mind that various aspects of the present disclosure were developed. Thus, techniques are described herein to improve the reliability and ease of communications with those inside of the enterprise environment.

SUMMARY

Implementations of the present disclosure involve a system and method for federating communications between a first network that transmits and receives messages formatted in a first format and a second network that transmits and receives messages formatted in a second format. The system and method are configured to receive a message from the first network formatted in the first format. The system then converts the message into a unified format that may be sent to the second network. After receiving the message in the unified format, the message may then be converted into the format of the second network and sent on the second network like any other message on the second network.

Implementations of the present disclosure also involve a system for converting messages sent on a first network and formatted in a first format to a destination on a second network and formatted in a second format. The system includes a gateway and a federation interface. The gateway is configured to convert messages between the first format and the unified format. Messages received at the gateway in the first format are converted to the unified format and sent to the federation interface. Messages received at the gateway formatted in the unified format are converted to the first format and sent to the first network. The federation interface is configured to convert messages between the unified format and the second format. Messages received at the federation interface in the unified format are converted to the second format and sent to the second network. Messages received in the second format are converted to the unified format and sent to the gateway.

BRIEF DESCRIPTION OF THE DRAWING

Throughout the drawing figures, like reference numerals will be understood to refer to like parts and components.

DETAILED DESCRIPTION

Implementations of the present disclosure involve a system and method for sending SMS messages from a cellular phone to an IM client located on an enterprise network as well as sending an IM message from the IM client located on the enterprise network to a cellular phone via an SMS message. In either direction, the messages are converted to a unified format that is used to bridge between SMS and IM protocols depending on whether the message originates as an SMS message or an IM message. The system may automatically and seamlessly convert SMS or IM messages to a unified format so that SMS systems may be federated with an enterprise's IM system. Federation involves the implementation of a system that allows for two previously disconnected systems to communicate or transfer data, and extends the ability of the systems to communicate with users otherwise not invisible to the other system. The SMS and IM systems may be federated to allow for increase ease and reliability of communication between parties.

Figure 1A:
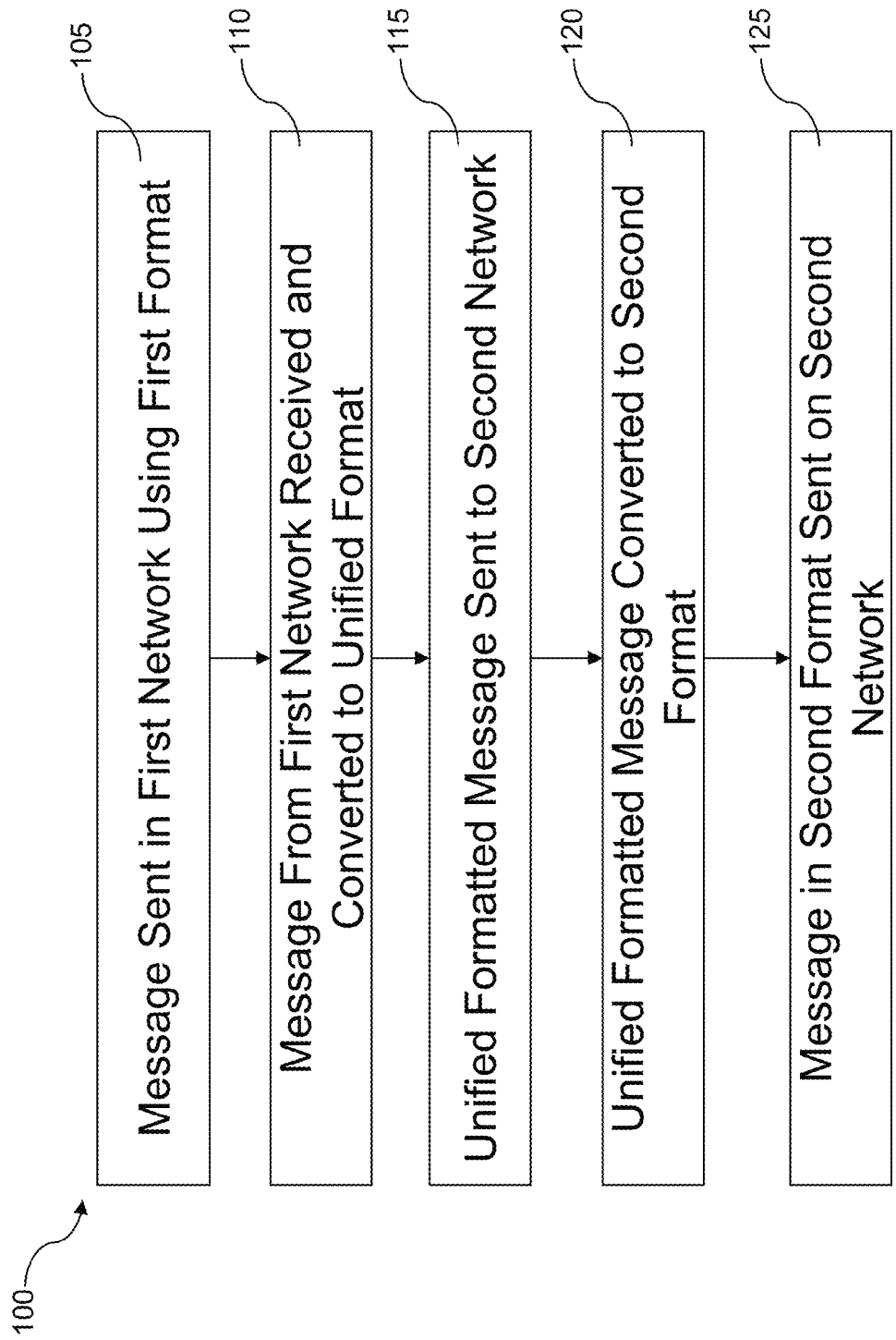
FIG. 1A is a flow chart depicting a method of sending a message from a first network to a second network.

Referring to FIG. 1A, a system and method for federating communications between two communications networks 100 is depicted. The rectangular elements are herein denoted as "steps" and represent computer software instructions or groups of instructions that carry out such functions. The flow diagrams do not necessarily depict the syntax of any particular programming language. Rather, the flow diagrams illustrate the functional information one of ordinary skill in the art could use to fabricate circuits or to generate computer software (or a hybrid of both circuits and software code) to carry out the features as described herein.

It should be noted that many routine program elements, such as initialization of loops and variables and the use of temporary variables are inherent in the flowcharts. It will be appreciated by those of ordinary skill in the art that unless otherwise indicated herein, the particular sequence of steps described is illustrative only and can be varied without departing from the scope of the present disclosure. Thus, unless otherwise stated the steps described below are unordered meaning that, when possible, the steps can be performed in any convenient or desirable order.

In this embodiment, a message may be sent in first network using a first message format (operation 105) and directed towards a user on a second network that uses a second message format. In this example, the first network and the second network are not configured to directly communicate with each other. In order for the message to be received by the user on the second network, the message may be converted to a unified message format (operation 110) that the second network is capable of receiving. The message encoded in the unified message format may then be sent to the second network (operation 115). Once the message has been received, it may again be reformatted, this time to the second message format (operation 120). Once the message is in the second message format, it may be sent on the second network and be received by the destination user (operation 125). The user on the second network may use the same methodology to send a user on the first network a message.

Figure 1B:
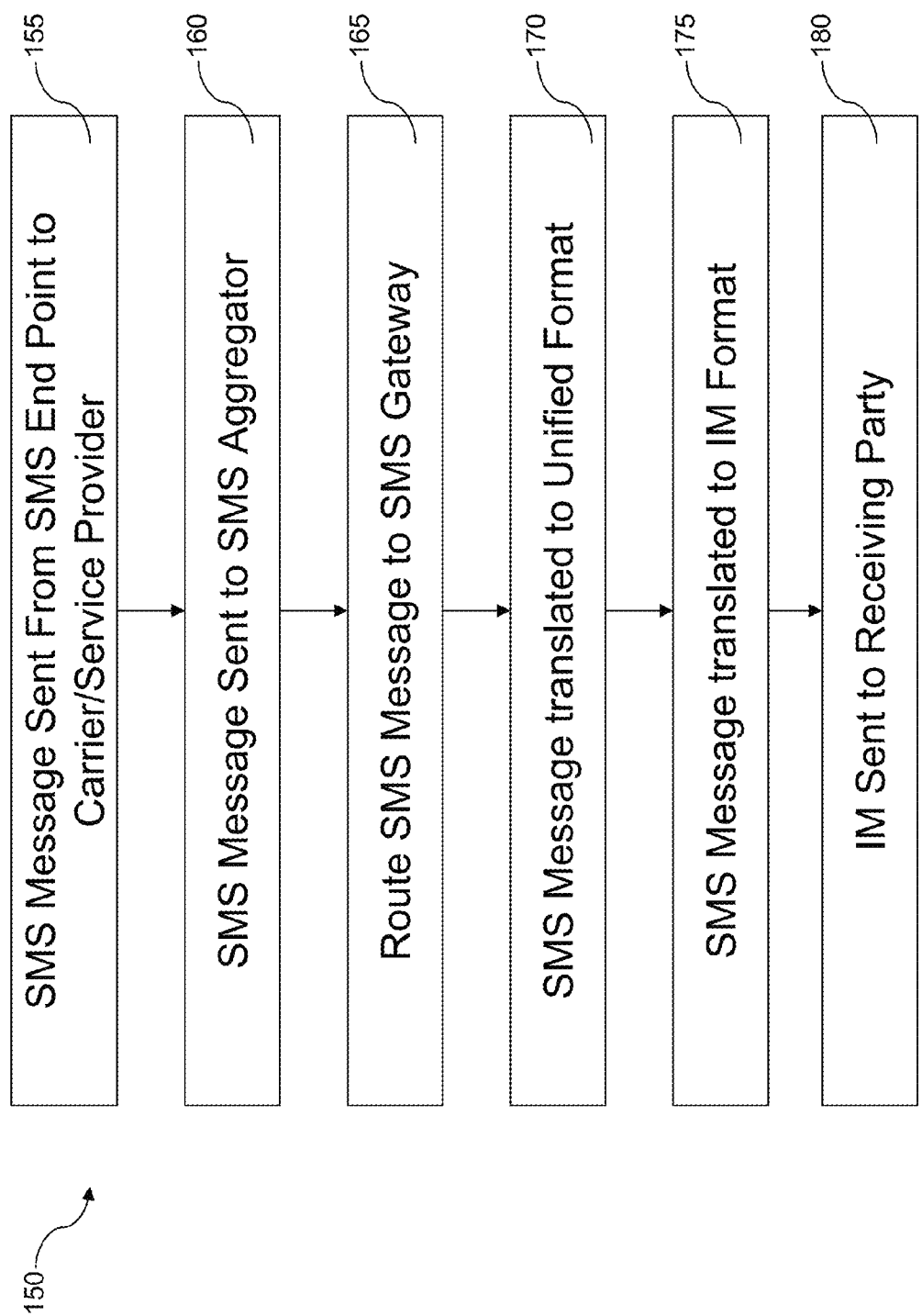
FIG. 1B is a flow chart depicting a method of converting an SMS message to an IM message.
Figure 2A:
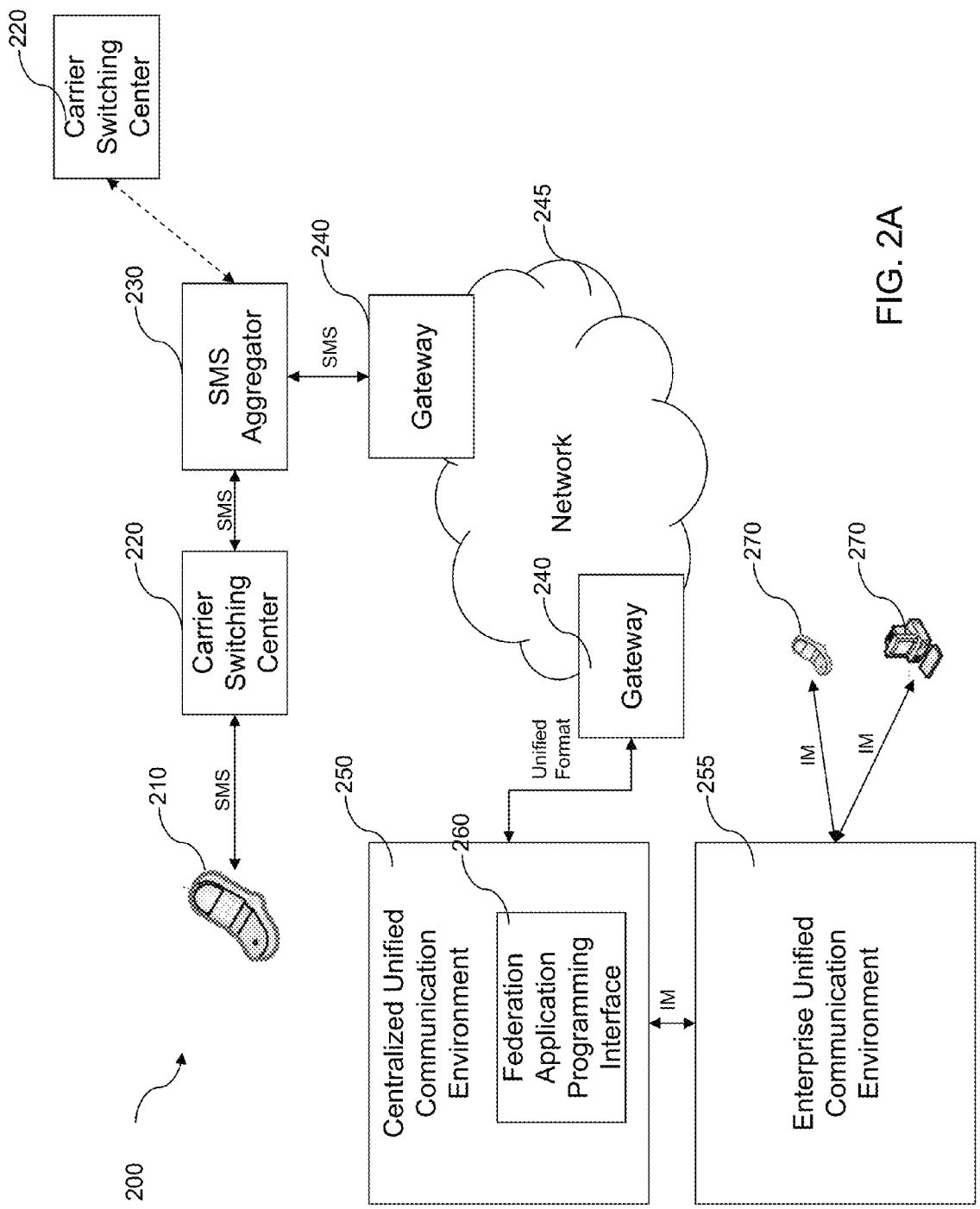
FIG. 2A is a block diagram of a network implementing the system and capable of performing the methods in accordance with an example embodiment.
Figure 2B:
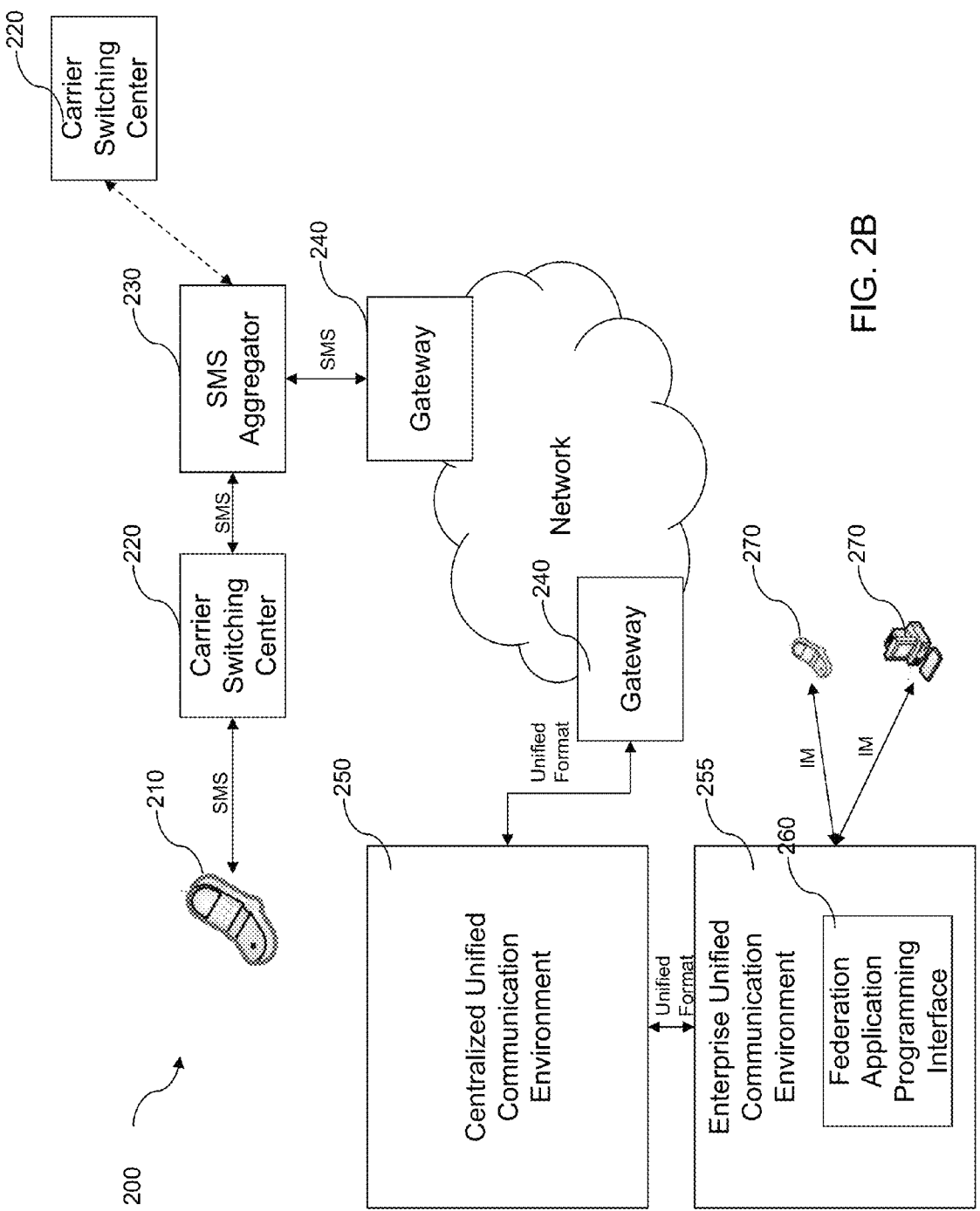
FIG. 2B is a block diagram of a network implementing the system and capable of performing the methods in accordance with another example embodiment.

Referring to FIG. 1B and FIGS. 2A-2B, an embodiment of a system 100 above that is directed towards translating and delivering SMS messages to an IM client in a unified communications environment that is not able to directly receive SMS messages is depicted. A sending party may enter a text message into his or her SMS endpoint 210, such as a traditional cellular phone, smart phone, tablet, or any other similar-type device capable of using SMS protocol (operation 155). The sending party may address and send the SMS text message via a communications network to a receiving party identified by the receiving party's telephone number. The receiving party's device 270 may or may not be configured to receive a SMS message in a conventional way, but is connected to a unified communications system 250,255.

The communications network may include a series of networks 245, switching centers 220, aggregators 230, and gateways 240 configured to route a SMS message from one SMS endpoint to another. The communications network, on the other hand, is not capable of directly accessing or sending or receiving data to or from the unified communications system 250, 255.

With the example of an SMS originating message, the carrier switching center 220 may receive SMS messages which may include data, voice, and other information from the SMS endpoint 210 and determine how to appropriately route the received SMS messages, data, and voice. SMS messages may be routed to the SMS aggregator 230 which may in turn route the SMS messages (operation 160) through a network 245 via one or more gateways 240. The SMS message may be converted to a unified message format (operation 170) and routed to a centralized unified communication environment 250 (operation 165).

The carrier switching center 220 may include a system of electronic devices configured to route and connect mobile devices to other telecommunications devices on the carrier's network. The SMS endpoint 210 may send messages to a carrier switching center 220. The carrier switching center 220 may receive the SMS messages, which may include data, text, images, voice, and other information from the SMS endpoint 210, and determine how to appropriately route the received SMS messages. People of ordinary skill in the art will recognize that the use or non-use of a carrier switching center 220 will depend on the nature of the SMS endpoint used by the calling party and the nature of the SMS endpoint associated with the called number. For example, and as is depicted in FIG. 2A and FIG. 2B, a call initiated with a cellular telephone may utilize the carrier switching center 220. Carrier switching centers are commonly used if the sending party and receiving party do not share the same cellular service carrier.

A SMS aggregator 230 may include a system of electronic devices specifically configured to route SMS messages to the appropriate carrier. The SMS aggregator 230 receives SMS messages from a variety of carriers and routes them to their final location. The SMS aggregator 230 may also temporarily store SMS messages when a SMS endpoint is unavailable or powered off and send the SMS message to the SMS endpoint when the endpoint becomes available again. In this example, the SMS aggregator 230 receives the SMS message from the carrier switching center 220, recognizes the destination address of the SMS message, and relays the SMS message to the gateway 240 which is associated with the Unified communications environment.

A telecommunications gateway 240 may include a network component configured to interface two networks that use different protocols. For example, the carrier switching center 220 and the SMS aggregator 230 operate on cellular or other telecommunications networks. The gateway 240 may operate as an interface with those telecommunications networks and a computing network 245 which may include a typical Transmission Control Protocol/Internet Protocol (TCP/IP) network such as the Internet or an intranet. In various embodiments, the gateway 240 may be connected to the same or an alternate network 245, such as a cellular network, public switched telephone network, Internet Protocol-based network, or any similar type of network. Once the SMS message reaches the centralized communication environment 250, the SMS message may travel through a second gateway that interfaces the network 245 to the centralized unified communication environment 250.

The centralized unified communication environment 250 may include a set of products, software, and devices configured to provide a consistent unified user interface and user experience across a series of devices. This allows for a series of communications mediums such as IM, voice/telephone, email, and conferencing or collaboration tools to be seamlessly integrated. For example, the centralized unified communication environment 250 may be a Microsoft® Lync® unified communications environment that ties the users corporate profile to a phone number, an IM username, voicemail, or any other communications mediums available at the user's office. Once the centralized unification communication environment 250 is reached, the SMS message may then be translated to an Instant Message ("IM") protocol message that is compatible with the centralized unification communication environment 250 (operation 175). The IM may then be sent to the receiving party according to the designated telephone number (operation 180).

The centralized unification communication environment 250 and the enterprise unified communication environment 255 may communicate through a federated environment utilizing the federation application programming interface 260. A federated environment allows for interoperability between two separate autonomous or semi-autonomous systems such as the centralized unified communication environment 250 and the enterprise unified communication environment 255. The federation application programming interface 260 may be configured to send and receive information from each communication environment 250/255 and translate the information into a format that each communication environment may be able to understand. This federation allows for each communication environment 250/255 to operate as autonomously as possible, yet still provide each other with any information needed for the communication environment to function. Thus, the unified communication environment 250/255 can receive, translate, and resend messages originally sent in SMS protocol in a translated IM protocol and vise-versa.

In the example depicted in FIG. 2A, the centralized unified communication environment 250 contains a federation application programming interface 260. The federation application programming interface 260 is capable of translating the SMS message protocol to IM protocol. From there, the IM message can be sent to one of perhaps a plurality of possible enterprise unified communication environments 255, which is federated with the centralized unified communication environment 250. A person of ordinary skill in the art will recognize at least one advantage of the embodiment as depicted in FIG. 2A is that one federation application programming interface 260 can service any number of different enterprise unified communication environments 255. From the enterprise unified communication environment 255, the IM message can be delivered to the receiving party's communication device 270. The receiving party's communication device 270 can be, for example, a cellular telephone, personal computer, or any other electronic device capable of receiving and displaying SMS or IM messages.

In FIG. 2B, yet another embodiment is depicted in the form of a system 200. FIG. 2B shows a system similar to that of FIG. 2A; however, in FIG. 2B the federation application programming interface 260 is located within the enterprise unified communication environment 255. Consequently, in FIG. 2B, the enterprise customer would install the federation application programming interface 260 within its own systems, as opposed to relying on a federation application programming interface 260 within the centralized unified communication environment 250.

Figure 3:
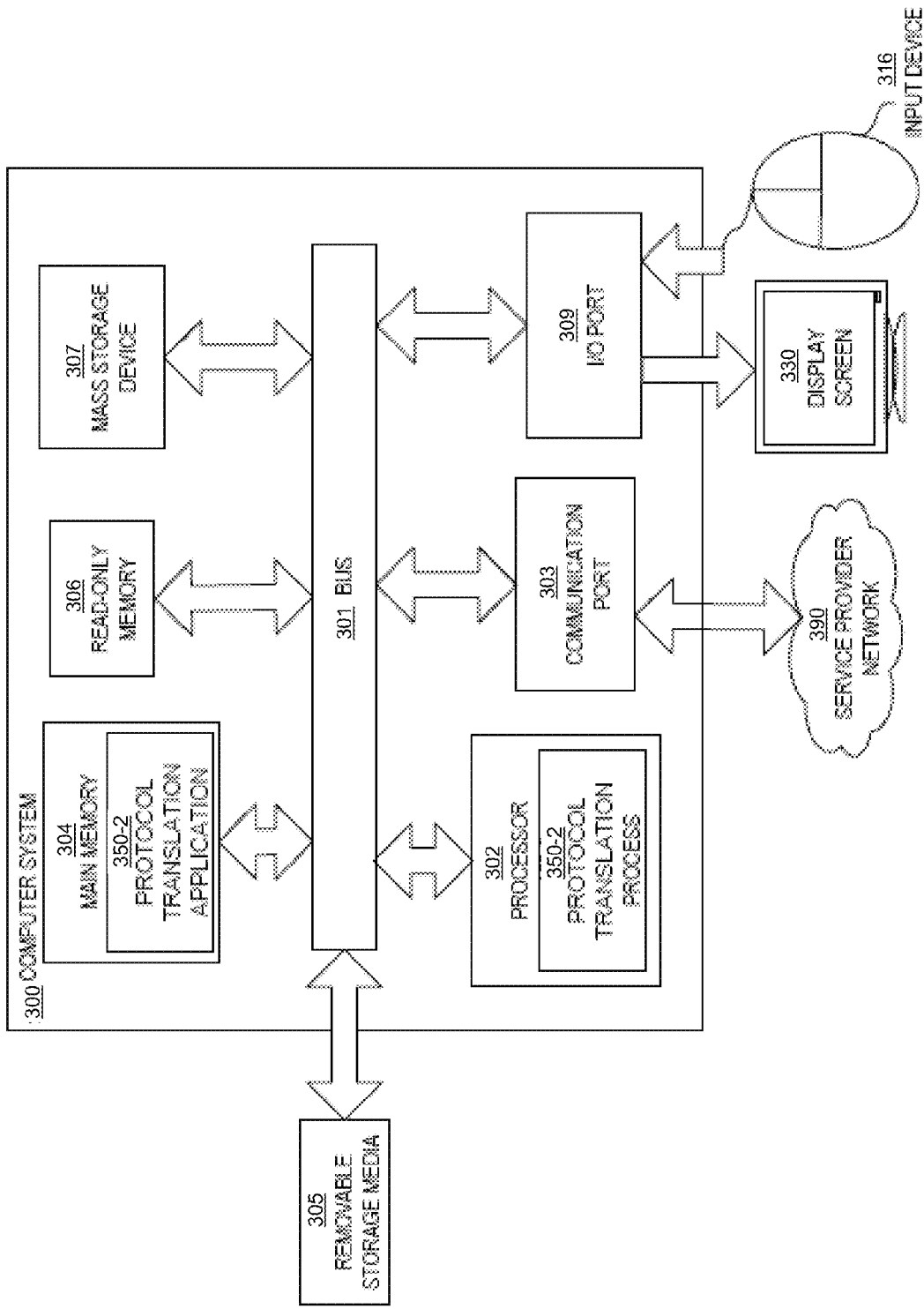
FIG. 3 is a block diagram of a computer system suitable for performing methods and implementing systems in accordance with an example embodiment.

FIG. 3 depicts a schematic diagram of a computer system 300 upon which various embodiments of the described methods may be carried out and implemented. According to the present example, the computer system 300 includes a bus 301 (i.e., interconnect), at least one processor 302, at least one communications port 303, a main memory 304, a removable storage media 305, a read-only memory 306, and a mass storage 307. Processor(s) 302 can be any known processor, such as, but not limited to, an Intel® Core®, Core 2®, Xeon®, Pentium®, Atom®, Itanium®, or Itanium2® processor(s), AMD® Opteron®, Turion®, Sempron®, Phenom®, or Athlon MP® processor(s), ARM, or Motorola® lines of processors. The communications port 303 can be any of: a RS-232 port for use with a modem based dial-up connection, a 10/100/1000 Ethernet port, a copper or fiber port, or a USB port. Communications port(s) 303 may be chosen depending on a network such as a Local Area Network (LAN), a Wireless Local Area Network (WLAN), a Wide Area Network (WAN), service provider network, customer network, cloud service provider network, or any network to which the computer system 300 connects (e.g., service provider network 390). The computer system 300 may be in communication with peripheral devices (e.g., display screen 330, input device 316) via Input/Output (I/O) port 309.

Main memory 304 can be Random Access Memory (RAM), or any other dynamic storage device(s) commonly known in the art. Read-only memory 306 can be any static storage device(s) such as Programmable Read-Only Memory (PROM) chips for storing static information such as instructions for processor 302. Mass storage 307 can be used to store information and instructions. For example, hard disks such as the Adaptec® family of Small Computer Serial Interface (SCSI) drives, Parallel AT Attachment (PATA) drives, Serial AT Attachment (SATA) drives, FLASH drives, an optical disc, an array of disks such as Redundant Array of Independent Disks (RAID), such as the Adaptec® family of RAID drives, or any other mass storage devices may be used.

Bus 301 communicatively couples processor(s) 302 with the other memory, storage and communications blocks. Bus 301 can be a PCI/PCI-X, SCSI, or Universal Serial Bus (USB) based system bus (or other) depending on the storage devices used. Removable storage media 305 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), Blu-ray Disc (BD) etc.

Embodiments herein may be provided as a computer program product, which may include a machine-readable medium having stored thereon instructions, which may be used to program a computer (or other electronic devices) to perform a process. The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

As shown, main memory 304 is encoded with Protocol Translation Application 350-1 that supports functionality as discussed above and as discussed further below. Protocol Translation Application 350-1 (and/or other resources as described herein) can be embodied as software code such as data and/or logic instructions (e.g., code stored in the memory or on another computer readable medium such as a disk) that supports processing functionality according to different embodiments described herein. During operation of one embodiment, processor(s) 302 accesses main memory 304 via the use of bus 301 in order to launch, run, execute, interpret, or otherwise perform the logic instructions of the Protocol Translation Application 350-1. Execution of Protocol Translation Application 350-1 produces processing functionality in Protocol Translation Process 350-2. In other words, the Protocol Translation Process 350-2 represents one or more portions of the Protocol Translation Application 350-1 performing within or upon the processor(s) 302 in the computer system 300.

It should be noted that, in addition to the Protocol Translation Process 350-2 that carries out method operations as discussed herein, other embodiments herein include the Protocol Translation Application 350-1 itself (i.e., the un-executed or non-performing logic instructions and/or data). The Protocol Translation Application 350-1 may be stored on a computer readable medium (e.g., a repository) such as a floppy disk, hard disk, or in an optical medium. According to other embodiments, the Protocol Translation Application 350-1 can also be stored in a memory type system such as in firmware, read only memory (ROM), or, as in this example, as executable code within the main memory 304 (e.g., within Random Access Memory or RAM). For example, Protocol Translation Application 350-1 may also be stored in removable storage media 305, read-only memory 306, and/or mass storage device 307.

As discussed herein, various embodiments may include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware.

For example, referring again to FIGS. 1A-B, the flow charts 100, 150 depict processing steps representing processing operations performed by the Protocol Translation Process 350 (i.e., Protocol Translation Application 350-1 and/or the run-time implementation of Protocol Translation Process 350-2) in accordance with one example embodiment. Furthermore, it should be understood that the alternative embodiments described below with relation to FIG. 4 and FIG. 5 may also represent processing operations performed by the Protocol Translation process 350.

Figure 4:
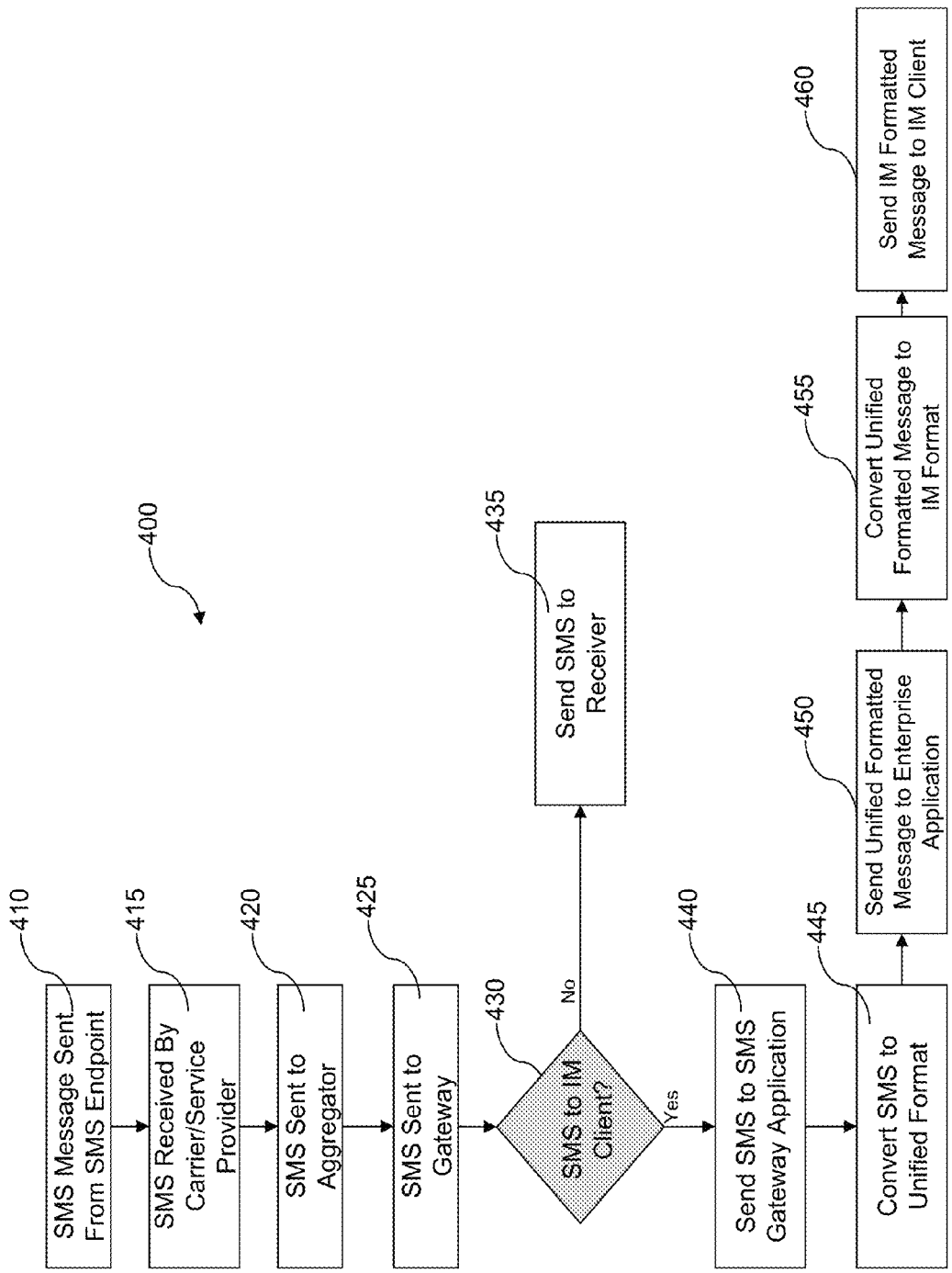
FIG. 4 is a block diagram of a system for converting SMS messages to IM messages.

Referring now to FIG. 4, a method of converting an SMS message to an IM message is depicted. An SMS message may be sent by an SMS end point (410). A carrier or service provider may then receive the SMS message and relay the SMS message to the appropriate destination (operation 415). For example, a carrier or service provider will generally evaluate a SMS message's destination to determine whether the destination is associated with the carrier or service provider network. If the destination is located on the carrier or service provider network, then the carrier or service provider will typically route the SMS message directly to the destination. If the destination is not located on the carrier or service provider network, the carrier or service provider will send the message to an SMS aggregator (operation 420). The SMS aggregator typically functions as a central repository of information regarding the carrier or service provider for the destination phone number and provides a means for routing the SMS message to that carrier or service provider. This may be performed using a database of phone numbers along with the correct carrier or service provider for each number. When the SMS aggregator receives an SMS message, the SMS aggregator determines, such as through a database query or look-up, the proper carrier or service provider for the SMS message and forwards the SMS messages accordingly. In this example, the SMS aggregator forwards the SMS message to a gateway (operation 425). The gateway may first determine whether the destination number is associated with a SMS-IM Enterprise (operation 430). If the destination is not associated with a SMS-IM Enterprise the gateway may route the SMS message like a typical SMS message (operation 435). If the destination is an SMS-IM Enterprise the SMS message may then be sent to the SMS-IM Gateway application (operation 440). The SMS-IM gateway application may access a global SMS to IM database to determine a destination enterprise network that the destination is connected to and then convert the SMS message to a unified communications format such as Hypertext Transfer Protocol, Hypertext Transfer Protocol Secure, or any other proprietary or non-proprietary communications format (operation 445). The SMS to IM database may include information regarding whether a number is associated with a SMS to IM enterprise and include any other unified communication environment information used for identifying how to route SMS to IM messages. The unified communications formatted message may then be sent to the appropriate SMS-IM enterprise application (operation 450) located within the destination enterprise network. The SMS-IM gateway application may then convert the unified communications formatted message into the appropriate IM format for the enterprise (operation 455) and communicate the message to the IM client (operation 460).

Figure 5:
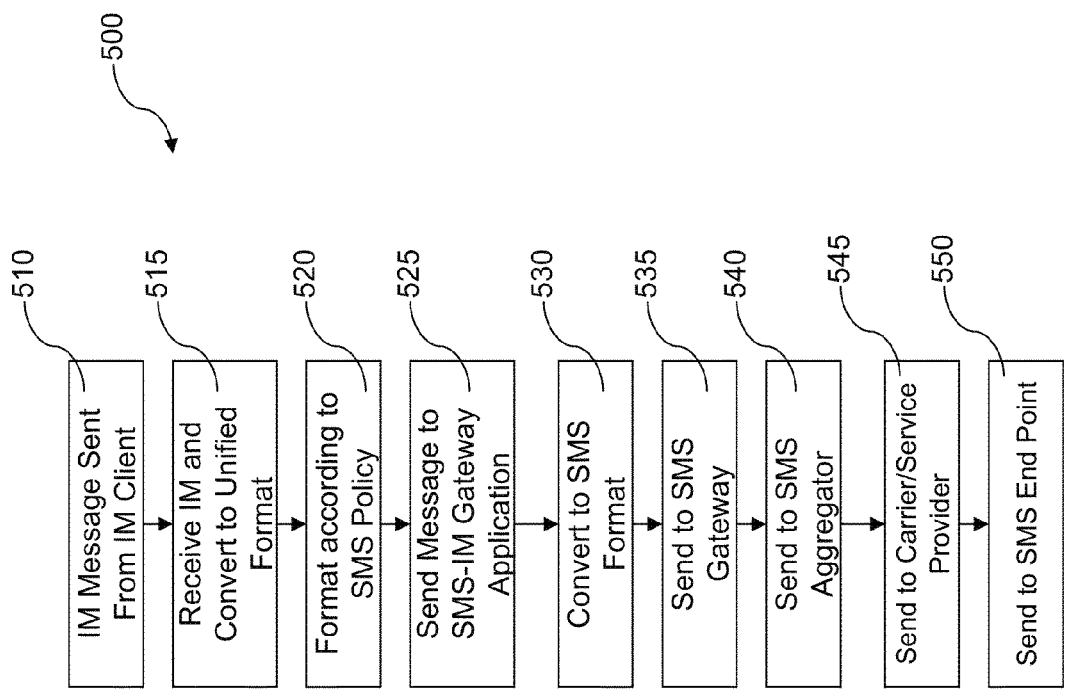
FIG. 5 is a flow chart depicting a method of converting IM messages to a SMS messages.

Referring now to FIG. 5, a method for converting an IM message to a SMS client 500 is depicted. A user may enter an IM message into an IM client running on their computer, smart phone, tablet computer, or other computing device. The IM formatted message may be identified as an IM to SMS message because the IM is addressed to a telephone number instead of an IM user (operation 510). Depending on the unified communication environment of the enterprise, in various embodiments, the user may be prompted to select a method of sending a communication. For example, the user may select a user by username or IM identifier and then select whether they would like to send a message by IM or SMS. In various embodiments, the unified communication environment may be configured to prompt a user to send an SMS instead of an IM when a user is not logged on to IM. The enterprise application may receive the IM message and convert the message from IM format to the unified communications format (operation 515). The message may also be checked against the SMS policy and formatted to conform to the policy (operation 520). For example, this may include checking the length of the message and comparing it to a character limit such as the typical SMS character limit of 160 characters. If a message is too long, the message may be divided into multiple parts and treated like a plurality of separate messages. After the IM message has be formatted into the unified format and any SMS policy violations have been remedied or removed, the unified formatted message may be sent to the SMS gateway application running on the SMS gateway (operation 525). The SMS gateway application may convert the message from the unified format to SMS format (operation 530) and then pass the SMS formatted message to the SMS gateway for normal SMS operation (operation 535). The SMS gateway may then send the SMS formatted message to a conventional SMS aggregator (operation 540) which in turn may send the SMS message to the appropriate carrier or service provider (operation 545). The carrier or service provider may then send the SMS to the destination SMS end point (operation 550) according to the carrier or service provider's policies.

Figure 6:
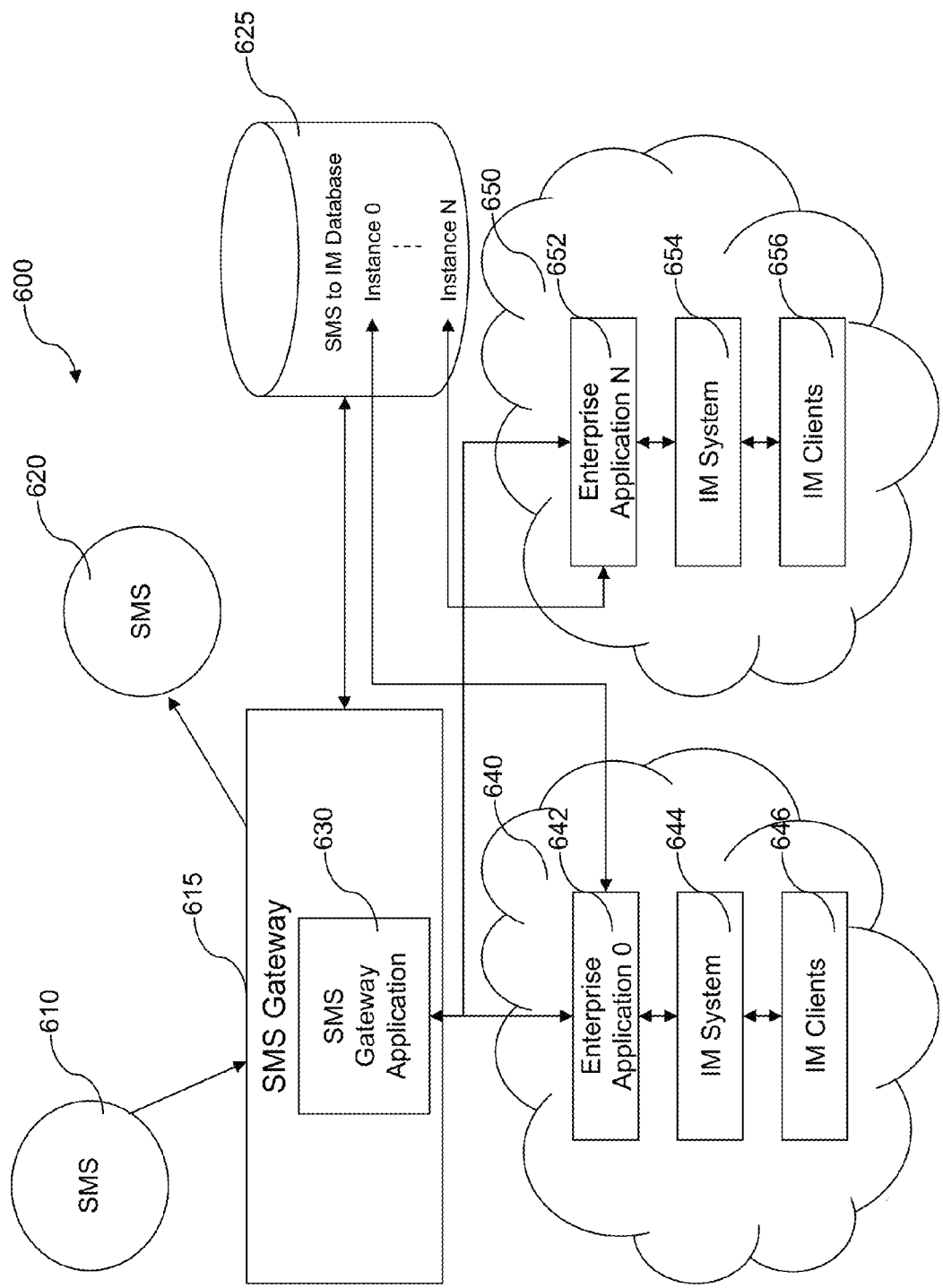
FIG. 6 is a block diagram of a system for converting SMS messages to IM messages and for converting IM messages to SMS messages.

Referring now to FIG. 6, an embodiment of a SMS to IM system 600 configured to convert SMS messages to an IM messages and IM messages to SMS messages is depicted. In this embodiment, SMS messages 610 may be sent from a SMS endpoint to a destination IM client 646, 656 and IM messages may be sent from an IM client to an SMS endpoint. The SMS to IM system may include an SMS gateway 615 configured to run an SMS gateway application 630. The SMS gateway 615 may be capable of both receiving a SMS message 610 and outputting an SMS message 620. The SMS gateway 615 may also be in communication with an SMS to IM database 625 as well as one or more enterprise environments 640, 650. The enterprise environments may include an enterprise SMS-IM application 642, 652, an instant messaging system 644, 654, and a plurality of IM clients 646, 656. The enterprise SMS-IM application 642, 652 may also be in communication with the SMS to IM database 625.

The incoming SMS message 610 may be produced by any SMS endpoint such as a cellular phone, a smart phone, or similar electronic device. The SMS endpoint may also include an electronic device running an application capable of sending SMS messages via a cellular or computer network. The SMS message 610 may be routed to the SMS gateway 615 in any conventional way. For example, SMS messages are typically routed from a SMS-enabled electronic device by way of a carrier or service provider and an SMS aggregator.

In various embodiments, the SMS Gateway 615 may be configured to determine how to route incoming and outgoing messages. The SMS gateway may be configured to send and receive SMS messages, send and receive unified formatted messages, and convert messages from SMS format to unified format and vice versa. For example, an incoming SMS message 610 may be sent as SMS messages 620 or may be converted to unified format and sent to an enterprise network. Incoming IM messages in the unified format may be converted to SMS messages, sent outside of the system and routed accordingly to the correct SMS endpoint. The SMS gateway 615 may include any conventional telecommunications equipment configured to receive and route SMS messages. In this embodiment, the SMS gateway 615 is configured to determine if an incoming text message should be routed to an IM client 646, 656 or if it should be sent as an SMS message 620. This may be done by first determining if the destination of the message is capable of receiving SMS to IM messages. This may involve checking the SMS to IM database 625 to see if the destination is an SMS to IM customer as well as querying the IM client 646, 656 to ensure that the IM client 646, 656 is logged on. Once it has been determined that the SMS message 610 may be converted to an IM message, the SMS gateway 615 may pass the message to the SMS gateway application 630.

The SMS to IM database 625 may include a conventional database connected to the SMS Gateway 615 and each enterprise network 640, 650. The SMS to IM database 625 may store any and all information necessary for contacting each user on the connected enterprise networks 640, 650. This may include which telephone numbers are associated with which enterprise network 640, 650, which enterprise networks are configured to receive SMS to IM messages, and each user's IM username and cellular telephone number. The SMS to IM database may run on a server, personal computer, or on the SMS Gateway 615 itself.

In various embodiments, the SMS gateway application 630 may be configured to format incoming SMS messages 610 into unified communication format messages as well as to reformat incoming unified communication format messages into SMS messages 620. The unified communications format may include any standard format for sending a communication over a digital network. For example, in various embodiments, the unified communication format may include HTTP or HTTPS formatted messages which include a destination address, a sender address, and a text or multimedia message. Outgoing messages arriving in the unified communication format may be reformatted into SMS formatted messages and sent out as SMS messages 620. Incoming SMS messages that are formatted into unified communication formatted messages may then be relayed to an enterprise application 642, 654 in an enterprise network 640, 650.

In this embodiment, the SMS gateway 615 may be in communication with one or more enterprise unified communications networks 640, 650. The enterprise unified communications networks 640, 650 may include typical enterprise intranets as well as the associated hardware and software required to maintain the networks including servers, routers, switches, firewalls and like. The enterprise unified communications networks 640, 650 may also be connected to any outside networks and the Internet. The enterprise unified communications networks 640, 650 may also include an enterprise application 642, 652 and an IM system 644, 654 operating on an intranet server as well as an IM client 646, 656 operating on each workstation connected to the enterprise unified communications network 640,650.

In various embodiments, the enterprise application 642, 652 is configured to encode and decode messages between the enterprises IM format and the unified communications format. For example, as described in reference to FIG. 4, incoming SMS messages 610 are received by the gateway 615, converted to a unified format by the SMS gateway application 630, and transmitted to the enterprise application 642, 652, which in turn reformats the message into the enterprise's IM format and sends the message to the appropriate IM client 646, 656 via the enterprise's IM system 644, 654. The enterprise application 642 also queries the SMS to IM database 625 to determine the proper user client 646, 656 to send the IM message to and may query the IM system 644, 654 to ensure that the user's IM client 646, 656 is online. If the user's IM client 646, 656 is not online, the enterprise application 642, 652 may select a course of action depending on the policy of the enterprise. For example, the enterprise application 642, 652, may select a phone number associated with the destination user, return the message to the SMS application 630 to be formatted and sent out as a SMS. The SMS may then be sent by the SMS Gateway application to the SMS gateway 615 and sent out as a SMS message. In another embodiment, the enterprise application 642, 652 may send the IM anyway and the IM system 644, 654 may hold the IM until the user logs back onto the IM system 644, 654. In various other embodiments, the system may both send the IM as an SMS to the phone number associated with the destination user and hold the IM in IM system 644, 654 until the user logs back onto the IM system 644, 654.

In one embodiment of IM to SMS conversion, the enterprise application 642, 652 may receive IM messages directed to phone numbers and compare the messages to a configurable messaging policy. For example, the configurable messaging policy may be setup to only allow SMS messages of a specific length. In another example, the configurable messaging policy may also be setup to only allow SMS messages and not MMS messages. The configurable message policy may include any other limitations or restrictions as set by a network administrator. The enterprise application 642, 652 may also rectify IM messages that fall outside of the configurable messaging policy. For example, if the IM message is too long, the enterprise application 642, 652 may break the message apart into several messages and then convert each of the several messages into a unified formatted message. In another example, if the IM message includes multimedia elements that are not allowed by the configurable messaging policy, the enterprise application 642, 652 may remove the not allowed multimedia elements.

The IM system 644, 654 and IM clients 646, 656 may include any IM conventional system and clients. Some enterprises may user proprietary IM environments while others may use common commercially available IM environments. The various embodiments are not limited by the type of IM environment used by the enterprise. The only requirement is that the enterprise application 642, 652 is capable of connecting to the IM environment and able to send and receive messages.

Although the present invention has been described with reference to various embodiments, it will be understood that the invention is not limited to the details thereof. Various modifications and substitutions will occur to those of ordinary skill in the art. All such substitutions are intended to be embraced within the scope of the invention as defined in the appended claims.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustrations only and are not intended to limit the scope of the present invention. References to details of particular embodiments are not intended to limit the scope of the invention.

What is claimed is:

1. A computer implemented method of federating communications between a first network and a second network, wherein the first network uses a Short Message Service (SMS) format and the second network uses an instant messaging (IM) format, the method comprising:
   receiving, at an SMS gateway, a message from the first network and formatted in the SMS format;
   converting, at the SMS gateway, the message from the SMS format to a unified format;
   sending the message formatted in the unified format to the second network;
   determining, at the second network after receiving the message formatted in the unified format, whether an IM client of a user is currently online on the second network;
   in response to determining that the IM client of the user is currently online on the second network:
      converting, at the second network, the message formatted in the unified format to the IM format; and
      sending the message in the IM format to the IM client of the user on the second network, wherein the sending of the message in the IM format comprises:
         querying a database to receive an identifier associated with the user, wherein the identifier comprises at least one of an IM username and an SMS capable telephone number; and
         sending the message in the IM format according to the identifier; and
   in response to determining that the IM client of the user is not currently online on the second network:
      selecting, at the second network, a phone number associated with the user;
      returning, to the SMS gateway, the message formatted in the unified format;
      converting, at the SMS gateway, the message from the unified format to the SMS format; and
      sending, from the SMS gateway, the message formatted in the SMS format to the first network using the selected phone number.

2. The method of claim 1, wherein the unified format comprises at least one of Hypertext Transfer Protocol (HTTP) and Hypertext Transfer Protocol Secure (HTTPS).

3. The method of claim 1, wherein the message comprises a source address, a destination address, and text.

4. The method of claim 1, further comprising determining whether to federate the message between the first network and the second network, wherein the determining whether to federate the message comprises querying a database for information regarding the availability of the second network to receive the message and the location of the second network.

5. The method of claim 4, wherein the determining whether to federate the message is made at the SMS gateway.

6. The method of claim 1, wherein sending the message formatted in the unified format to the second network comprises:
   selecting the second network from a plurality of networks each having a message format; and
   sending the message formatted in the unified format to the second network based on the selecting of the second network.

7. A computer implemented method of federating communications between a first network and a second network, wherein the first network uses a Short Message Service (SMS) format and the second network uses an instant messaging (IM) format, the method comprising:
   receiving, at an SMS gateway, a message from the first network and formatted in the SMS format;
   determining, at the SMS gateway, whether an IM client of a user is currently online on the second network;
   in response to determining that the IM client of the user is not currently online on the second network, forwarding the message formatted in the SMS format to the user; and
   in response to determining that the IM client of the user is currently online on the second network:
      converting, at the SMS gateway, the message from the SMS format to a unified format;
      sending the message formatted in the unified format to the second network;
      converting, at the second network, the message formatted in the unified format to the IM format; and
      sending the message in the IM format to the IM client of the user on the second network, wherein the sending of the message in the IM format comprises:
         querying a database to receive an identifier associated with the user, wherein the identifier comprises at least one of an IM username and an SMS capable telephone number; and
         sending the message in the IM format according to the identifier.

8. The method of claim 7, wherein the unified format comprises at least one of Hypertext Transfer Protocol (HTTP) and Hypertext Transfer Protocol Secure (HTTPS).

9. The method of claim 7, wherein the message comprises a source address, a destination address, and text.

10. The method of claim 7, further comprising determining whether to federate the message between the first network and the second network, wherein the determination comprises querying a database for information regarding the availability of the second network to receive the message and the location of the second network.

11. The method of claim 7, wherein the determination is made at the SMS gateway.

12. The method of claim 7, wherein sending the message formatted in the unified format to the second network comprises:
 selecting the second network from a plurality of networks each having a message format; and
 sending the message formatted in the unified format to the second network based on the selecting of the second network.

13. A system for federating the communication of a message between a Short Message Services (SMS) communications network operating using an SMS message format and an instant messaging (IM) communications network operating using an IM message format, wherein the SMS communications network and the IM communications network are not in direct communication, the system comprising:
 a gateway in communication with both the SMS communications network and a federation interface, wherein the gateway is configured to:
  convert messages received from the SMS communications network in the SMS message format to a unified message format and transmit the converted message over a third communications network to the federation interface; and
  convert messages received over the third communications network from the federation interface in the unified message format to the SMS message format and transmit the converted message to the SMS communications network; and
 wherein the federation interface is in communication with both the IM communications network and the gateway and the federation interface is configured to:
  convert messages received over the third communications network from the gateway in the unified message format to the IM message format and transmit the converted message over the IM communications network; and
  convert messages received over the IM communications network in the IM message format to the unified message format and transmit the converted message over the third communications network to the gateway; and
 wherein the system further comprises a server hosting a database storing a listing of users on the IM communications network, the listing comprising at least one entry, the at least one entry comprising an IM username, a telephone number, and an indication of whether a user corresponding to the at least one entry may receive IM messages converted from SMS messages.

14. The system of claim 13, wherein the unified message format comprises at least one of Hypertext Transfer Protocol (HTTP) and Hypertext Transfer Protocol Secure (HTTPS).

15. The system of claim 13 wherein the message comprises a source address, a destination address, and text.

16. The system of claim 15, wherein the gateway is further configured to determine whether to federate a message sent on the SMS network to the IM communications network according to the destination address.

17. The system of claim 16, further comprising a plurality of federation interfaces, wherein the gateway is configured to:
 compare the destination address to a corresponding database entry;
 determine a destination federation interface; and
 convert the message received from the SMS communications network in the SMS message format to the unified message format and transmit the converted message to the destination federation interface.

18. The system of claim 17, wherein the transmitting of the converted message to the destination federation interface comprises at least one of:
 sending the message according to the indication of whether the database entry may receive IM messages; or
 converting the message back to the SMS message format and sending the message on the SMS communications network.

* * * * *